United States Patent [19]

Rowell

[11] 4,285,113
[45] Aug. 25, 1981

[54] METHOD OF FORMING BRASSIERE WIRES

[76] Inventor: Ross F. Rowell, 5361 Belmore, Montreal, Quebec, Canada

[21] Appl. No.: 89,091

[22] Filed: Oct. 29, 1979

Related U.S. Application Data

[62] Division of Ser. No. 897,850, Apr. 19, 1978, Pat. No. 4,201,220.

[51] Int. Cl.³ .................. B23P 17/00; B22D 11/126; A41C 1/14
[52] U.S. Cl. .................................... 29/413; 29/527.4; 128/476
[58] Field of Search ................ 128/476; 29/413, 527.4

[56] References Cited

U.S. PATENT DOCUMENTS

| 3,412,912 | 11/1968 | Rosenberg | 29/413 X |
| 3,777,763 | 12/1973 | Schwartz | 128/476 |
| 4,153,062 | 5/1979 | Delet | 128/476 |
| 4,201,220 | 5/1980 | Rowell | 128/476 |
| 4,235,240 | 11/1980 | Cousins | 128/476 |

Primary Examiner—Nicholas P. Godici
Assistant Examiner—V. K. Rising
Attorney, Agent, or Firm—Robert J. Schaap

[57] ABSTRACT

The present invention provides an improved wire stiffening member for use in a garment such as a brassiere wherein the wire member has a flexible end provided by forming a sheath about the end, which end has a line of weakening therein, and subsequently breaking the end along the line of weakening.

7 Claims, 9 Drawing Figures

METHOD OF FORMING BRASSIERE WIRES

This application is a divisional application of the commonly owned copending patent application for "IMPROVEMENTS IN BRASSIERE WIRES", bearing Ser. No. 897,850 filed Apr. 19, 1978 and now U.S. Pat. No. 4,201,220.

The present invention relates generally to brassieres and more particularly, relates to improvements in wire members for use in brassieres.

The use of wires as stiffening members or frames in the manufacture of brassieres is well known in the art. The wires have a generally U-shaped configuration extending along the side and bottom peripheral portions of the brassiere cups and are generally of a rectangular cross-section with the longer dimension extending radially with respect to the curvature of the wire. The wires are secured to the brassiere by enclosing the wires within the fabric along the perimeter of the brassiere cups; the wires are retained by means of stitching about the wires and, in some instances, by sewing through plastic portions of the wires.

One problem which has been encountered, particularly when the brassiere is repeatedly washed, is that shrinkage of the fabric causes the wires to tear through the stitching or fabric of the brassiere and become a source of discomfort to the wearer.

To obviate the above problem, it has been proposed in the art to provide plastic end caps or tips of a plastic material. Although such plastic ends have a lesser tendency to tear through the fabric than, for example, a typical metal wire, the ends of the wires remain relatively stiff and can be a source of discomfort to the wearer.

A further solution proposed in the art with respect to end caps or tips is one wherein the plastic material forming the cap extends beyond the end of the wire for a substantial distance, the end cap being of a flexible material. This renders the end of the wire more resilient than would otherwise be the case. In a frequently used commercial embodiment of such end caps, the cap is of a flexible plastic material and has an aperture or like means therein adapted to mate with a projection on the wire for retaining the cap thereon. While such a construction provides substantial advantages over a bare metallic wire member, it has been found that these members which are slipped on the wire may become disengaged therefrom after repeated washing of the garment. Futhermore, these end caps are frequently secured to the wire after the same has been inserted in the garment and the manual operation of so doing is an expensive one.

It is therefore an object of the present invention to provide a wire member suitable for use in a brassiere or other garment which has a flexible end and yet is securely retained on the wire member.

According to one aspect of the present invention, there is provided, in a wire member for use in a garment, the improvement wherein said wire member has at least one flexible end, said flexible end having a sheath of a flexible material formed thereabout, a portion of said wire member being detached from the main portion thereof and being enclosed in said sheath.

According to a further aspect of the present invention, there is provided a method for manufacturing an improved wire member for use in a garment, which method comprises the steps of supplying an elongated wire member, forming at least one line of weakening in said wire member proximate an end thereof, encasing said end in a sheath of flexible material adhering to said end, said sheath extending about said end and said line of weakening and subsequently breaking said wire along said line of weakening.

In greater detail, the wire member described herein is particularly suitable for use in a garment such as a brassiere although the teachings of the present invention may equally well be applied to other garments wherein wire stiffening members are employed and wherein it is desired to impart flexibility to an end portion thereof. In the instant specification, it will be understood that the term "wire" includes members of various materials. Thus, in brassiere manufacture, the most widely used wires are of a metallic material and reference herein will generally be made to wires of metallic material. However, the present invention includes wires made of other materials known to those skilled in the art wherein it is desired to provide a flexible end portion.

As aforementioned, wires employed in brassieres are generally of an arcuate configuration and are substantially C or U-shaped with the cross-section frequently being rectangular with the longer dimension of the wire extending radially with respect to the curvature of the frame—reference may be had to U.S. Pat. Nos. 2,705,800; 2,746,052; 3,702,614 and 3,799,175.

The conventional wire member, according to the present invention, is provided with a line of weakening proximate at least one end thereof. This line of weakening may be provided by many known conventional means; for example, score lines or notches may be formed in the wire member proximate the end thereof to form a spot wherein the wire is weakened for subsequent breaking. It will be understood that other means may equally well be employed and indeed, the wire member may be manufactured with a line of weakening therein.

As aforementioned, at least one end of the wire is provided with the aforesaid line of weakening. In many instances, it is desirable to provide flexible ends for both ends of the wire and accordingly, the teachings of the present invention may be employed for providing the flexible ends.

Following the formation of the line of weakening proximate the end of the wire, a sheath of a flexible material is formed about the end, with the sheath extending from the end point along the wire past the line of weakening. In the preferred embodiments of the invention, the sheath is formed by dipping or otherwise applying to the end of the wire a liquid material which is curable to form a solid flexible sheath. Many such materials are known to those skilled in the art and preferred materials include various polymeric materials capable of being applied in the liquid form and cured to form a solid sheath. It will naturally be understood that means such as spraying of the liquid material may equally well be employed. Also, the formation of an end cap and securing of the same to the wire end may equally well be employed.

After the sheath has been formed on the end of the wire, the wire is broken along the line of weakening. The breaking of the end may be accomplished by many different suitable means and results in the wire having a sheath about the end, which sheath provides a protection from sharp edges while also providing a flexibility in that the sheath bends along the line of weakening where the end tip has been broken away from the main body of the wire.

Having thus generally described the invention, reference will be made to the accompanying drawings illustrating an embodiment thereof, in which.

Figure 1:
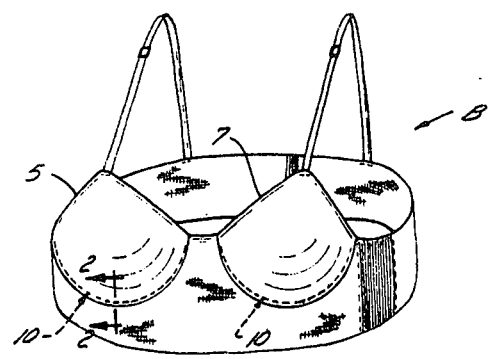
FIG. 1 is a perspective view of a brassiere which includes wire members according to the present invention.

Referring to the drawings in greater detail, and by reference characters thereto, there is shown in FIG. 1 a brassiere, indicated generally by reference character B, which includes two cups 5 and 7 in which are embedded generally U-shaped wires 10. It will be appreciated that wires 10 could also be incorporated, with different outlines, into other garment structures such as corsets, girdles, etc., for stiffening and/or shaping purposes.

Figure 2:
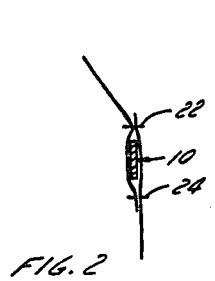
FIG. 2 is a cross-sectional view taken along the lines 2—2 of FIG. 1.
Figure 3:
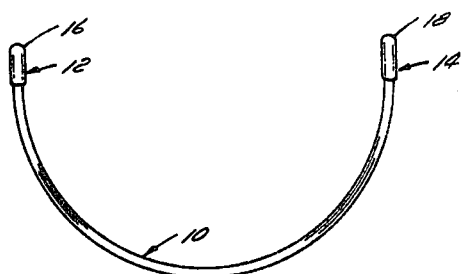
FIG. 3 is a front elevational view of a wire member such as is employed in the brassiere of FIG. 1.

Each wire 10 is, as shown in FIG. 2, encased or enclosed in a tunnel or a tube of fabric by means of stitching 22 and 24. While the general cross-section of wire 10 is shown as being rectangular, other cross-sectional forms such as oval or circular, among others, may be employed. It will also be appreciated that wire 10 may be made of many suitable materials known to those skilled in the art and selected from those materials having the requisite characteristics of flexibility and resiliency in the transverse direction and of support in the other direction.

Each wire 10 has a pair of ends generally designated by reference numerals 12 and 14, with sheaths 16 and 18 being provided about ends 12 and 14 respectively.

Referring to FIGS. 4 through 7, the formation of a flexible portion at end 12 is illustrated. It is understood that a like construction may be employed at end 14 if so desired.

Figure 4:
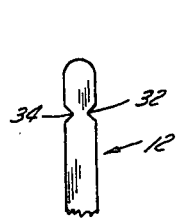
FIG. 4 is a detailed front elevational view of an end portion of the wire member prior to formation of the sheath thereabout.
Figure 5:
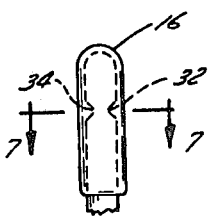
FIG. 5 is a view similar to FIG. 4 showing the formation of the sheath about the end.

As shown in FIG. 4, end 12 is first provided with a line of weakening by means of a pair of inwardly directed notches 32 and 34. Following formation of notches 32 and 34, sheath 16 is formed about end 12. In this respect, and as will be seen from FIG. 5, sheath 16 extends completely about end 12 and about notches 32 and 34. As previously discussed, sheath 16 is formed of a flexible material and is preferably formed by applying the material in a liquid form and subsequently curing the same.

Figure 6:
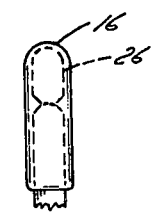
FIG. 6 is a view similar to FIGS. 4 and 5 illustrating the final form of the end.
Figure 7:
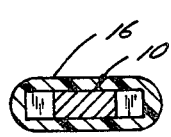
FIG. 7 is a cross-sectional view along the line 7—7 of FIG. 5.

Turning to FIG. 6, following formation of sheath 16 about end 12 and the line of weakening contained therein, tip portion 26, which is separated from the main body portion of wire 10 is broken therefrom along the line of weakening formed by notches 32 and 34. Thus, the end has a tip portion 26 which is formed of an original portion of wire member 10 and which is encased in a flexible sheath 16. Thus, the end is permitted to flex along the original line of weakening due to the flexible nature of sheath 16.

Figure 8:
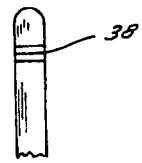
FIG. 8 is a detailed front elevational view of an end of a wire member and the means for forming a line of weakening therein.
Figure 9:
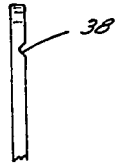
FIG. 9 is a side elevational view of the end illustrated in FIG. 8.

As aforementioned, various means may be employed for forming the line of weakening in the end. Thus, as shown in FIGS. 8 and 9, a score-line 38 along the "flat" side of wire 10 may be employed.

As will be appreciated, the above construction provides an arrangement wherein the end of the wires are relatively soft due to the nature of the material forming the sheath and at the same time, are flexible due to the breaking of tip portion 26. Furthermore, the sheath formed about the end is securely adhered thereto obviating the prior art problems of the end caps slipping off the wires.

It will be understood that the above-described embodiment is for purposes of illustration only and that changes and modifications may be made thereto without departing from the spirit and scope of the invention.

I claim:

1. A method of forming a flexible end in a wire member for use in a garment, the method comprising the steps of supplying an elongated wire member, forming a line of weakening proximate one end of said member, forming a sheath of a flexible material about said one end, and breaking said end of said wire member at said line of weakening.

2. The method of claim 1 wherein the step of forming a sheath about said end comprises the step of dipping said end in a curable polymeric material.

3. The method of claim 1 further including the steps of forming a line of weakening at the other of said ends of said elongated wire member, forming a sheath of flexible material about said other end, and breaking said other end along said line of weakening.

4. The method of claim 2 wherein the step of forming a line of weakening comprises cutting at least one notch in said member.

5. The method of claim 1 wherein said wire member is formed of a metallic material.

6. The method of claim 5 wherein said wire member has a rectangular cross-sectional configuration.

7. The method of claim 6 wherein the method comprises providing a pair of V-shaped notches at said line of weakening.

* * * * *